United States Patent [19]

Singh

[11] Patent Number: 5,025,392

[45] Date of Patent: * Jun. 18, 1991

[54] APPARATUS AND METHOD FOR EXPERT ANALYSIS OF METAL FAILURE WITH AUTOMATED VISUAL AIDS

[76] Inventor: Guryinder P. Singh, 9303 Lockridge, San Antonio, Tex. 78250

[*] Notice: The portion of the term of this patent subsequent to Sep. 4, 2007 has been disclaimed.

[21] Appl. No.: 529,879

[22] Filed: May 29, 1990

Related U.S. Application Data

[63] Continuation of Ser. No. 268,846, Nov. 9, 1988, Pat. No. 4,954,964.

[51] Int. Cl.⁵ ............................................. G06F 15/18
[52] U.S. Cl. .................................... 364/513; 364/507
[58] Field of Search ............... 364/513, 200, 900, 507, 364/508, 188

[56] References Cited

PUBLICATIONS

Plant Availability Improvement: Expert System Approach for Determining Boiler-Type Failure Mechanisms; G. P. Singh et al.; 87-JPGC-Pwr-14; Joint ASME/IEEE Power Generation Conference; Oct. 4-8, 1987; pp. 1-6.

FAME-An Expert System for Failure Analysis of Metals; Elsley et al., ISTFA '87: Advanced Materials; pp. 1-9; Nov. 9-13, 1987; ASM International.

Primary Examiner—Allen R. MacDonald
Attorney, Agent, or Firm—John R. Merkling

[57] ABSTRACT

Apparatus and a method for providing a micro-computer based expert system having a knowledge base of failure analysis, as it pertains to metallic components. The apparatus and method includes interactive initialization procedure which includes communications between the user and the knowledge base. The system and method incorporates automated visual aids for the analysis of metal failure.

13 Claims, 4 Drawing Sheets

APPARATUS AND METHOD FOR EXPERT ANALYSIS OF METAL FAILURE WITH AUTOMATED VISUAL AIDS

This is a continuation of copending application Ser. No. 07/268,846, filed on Nov. 9, 1988 now U.S. Pat. No. 4,954,964.

BACKGROUND OF THE INVENTION

1. Field of the Invention

The invention relates generally to the analysis of metal failure, and specifically to combining automated visual aids with an expert system having a knowledge base of metal failure.

2. Background of the Invention

For many years the problems associated with metal failure in the industrial environment have been researched and documented. This knowledge is extensive and is mainly in the hands of metallurgical experts. The costs of repairing components due to metal failures is high. Expert systems have been employed in industrial plants, service companies, and medical institutions to diagnose problems or illnesses. Expert systems have not been used in conjunction with visual displays for metal failure analysis.

Metal failures are analyzed using metallurgical expertise and techniques. These metal failures may occur in components such as pumps, valves, turbine blades, gears, shafts, drives, and virtually any other mechanical structural or aerospace metallic component. Normally sections of pieces of the damaged component are sent to a metallurgist outside the plant site where the failure occurred. The metallurgist may be from an independent consulting firm or may be employed by the company where the failure occurred if the expense of a full-time expert can be justified. Even if a company has a full-time metallurgist, the metallurgist may be far from the emergency at hand, working out of a distant home office. Since metal analysis must be performed by the metallurgist in person, a great deal of time and expense are wasted either by shipping failed parts to the metallurgist or by transporting the expert to the failure site.

Normally these metal failure experts rely on private knowledge and past experiences to analyze the failed component rather than just chemical or physical evaluation procedures. These "intuitive" and knowledge based techniques are often performed in an apparently unsystematic fashion. This apparently unsystematic procedure is comparable to the question and answer routines physicians use in diagnosing a patient's illness. An "If-Then" type logic precedes actual physical or biological tests and can often be used to determine the exact cause of the problem or illness, and is used in conjunction with a visual examination. Subsequent testing is used for verification.

First, the metallurgist asks the maintenance staff questions pertaining to the material, location, and environment where the failure is concerned. Visual inspections may be performed. In metallurgical failure analysis, the appearance can often indicate the cause of a problem with a component, but this information has been unavailable until now to the personnel who routinely repair, replace, or inspect the component in question. From the appearance of the failed component the failure mechanisms can often be determined, or it may be determined that further testing is needed. Often these tests are performed as a means of verifying the mechanism before the root-cause is confirmed by the metallurgist. The tests may be non-destructive evaluations (ultrasonic, radiography, computer tomography, etc.); chemical tests (hydrogen, embrittlement, erosion/corrosion analysis; etc.) or physical tests (stress tests, fatigue testing, hardness testing, etc.). This process has not been well systematized for non-experts by the prior art because of lack of visual display providing correlation between observations and relevant conditions for isolating failure mechanisms.

Another object is to provide an expert system with relevant exemplary video displays correlated to both information gathering and solution presentation modes.

A further principal object of the present invention is to be able to use a visually aided expert system as an inanimate metallurgical consultant for determining the failure mechanisms and root-causes of the metal failure and deterioration.

Another important object is to provide an expert system for trouble-shooting metal failures which provides the equivalent of the human expertise employed by the metallurgical specialist, whose expertise would not be lost due to retirement, promotion, death or transfer.

Another paramount object of the invention is to provide visual aids depicting both a macroscopic and microscopic appearance of metal failures that are coordinated for display by an expert system program and which can be used by an operator in the system to find a failure mechanism and to conduct root cause analysis.

It is an object of the invention to provide a knowledge base housed in an expert system which would be constantly upgraded at appropriate intervals. A further paramount object of the invention is to assure that the knowledge contained in an expert system is easily transferable and can be applied at many different locations simultaneously.

It is also an object of the invention to provide an expert system for use in metal failure analysis which can provide immediate solutions whereby valuable time is conserved and corrective actions are implemented quickly at a time when obtaining this information is essential.

SUMMARY OF THE INVENTION

I have invented a system and method for metal failure analysis using a visually aided computer based expert system. It can be used to analyze metal failures in aircraft, industrial equipment, metal structures, nonindustrial equipment, and similar applications. It is an expert system that uses rule-based investigative procedures. An if-then based logic course is followed by the rules incorporated in the knowledge base. Thus, it creates a understandable systematic approach in determining the failure mechanism that can be used by non-experts as opposed to the normal, apparently non-systematic, intuitive course followed by human experts.

Through automated visuals emanating from a slide viewer/projector or other pictographic or photographic apparatus, the system uses pictures of failed metal components in identifying the failure mechanism. By showing an individual what to look for it assists the individual in arriving at a decision of information to be supplied to the expert system. The appearance of a component can be an accurate indicator of metallurgical properties of the component. Only after determining or analyzing the macroscopic or microscopic appearance does the expert system or its human expert counterpart suggest further specific testing to determine or verify the failure mechanism.

Repeat failures in all types of metal components often are similar in appearance and can be represented on color or black and white transparencies, video displays or other photographic or pictographic means. An expert system program can be effectively structured on rules based on failed metal appearance, among other factors. Overall, in all areas of metal failures these can number in the thousands, but when broken down by specific components and failure mechanisms the different guises are few and are systematically manageable when combined with the rule-based investigative procedures employed by the expert system. By coupling these logically sequenced visual images with an expert system a unique tool has been created to aid the non-expert in determining the failure mechanisms in failed metal components, using information as to appearance, location, environment, preceding history or events and so on. It can also be used for training purposes. The system and method also incorporates a data base to provide statistical data to plan inspections, update the rules of the knowledge base, or to generate reports detailing a failure incident.

The system can be operated on a micro computer or other data processing system and includes both expert system and database software. These are linked by an interface card to a computer controlled visual display, such as a slide projector, video disk, or video tape.

Graphics displayed on the computer's monitor interact with the various data base sections. Detailed diagrams of the equipment components in question are displayed on the monitor and specific areas of each can be examined closely. The specific parts have their own records which can be pulled up for updating and review. Actual photographs of the various parts can also be displayed on the visual display. The different examples of metal failures can also be reviewed in this fashion.

Besides the expert system (diagnostic) and database modules, the system also contains an information retrieval module. This module contains additional information on nondestructive evaluation (NDE) methods, welding procedures, root-cause analysis, metallurgical testing, corrective actions, references to other sources of information and similar information.

Once the expert system (diagnostic module) has determined the failure mechanism, a root-cause is projected. If the expert system is unable to determine the failure mechanism due to a lack of data it can still project probable mechanisms using the data it has already obtained. In some instances further information, such as the results of metallurgical tests, is needed by the program to determine the failure mechanism and root-cause. If this is the case, the program will ask for and direct the user to the information it needs.

It is an object of the present invention to provide a micro-computer based expert system for metal failure analysis having an video or photographic display.

These and other objects of the present invention will be apparent from the detailed description, taken with reference to the accompanying drawings.

DETAILED DESCRIPTION

Figure 1:
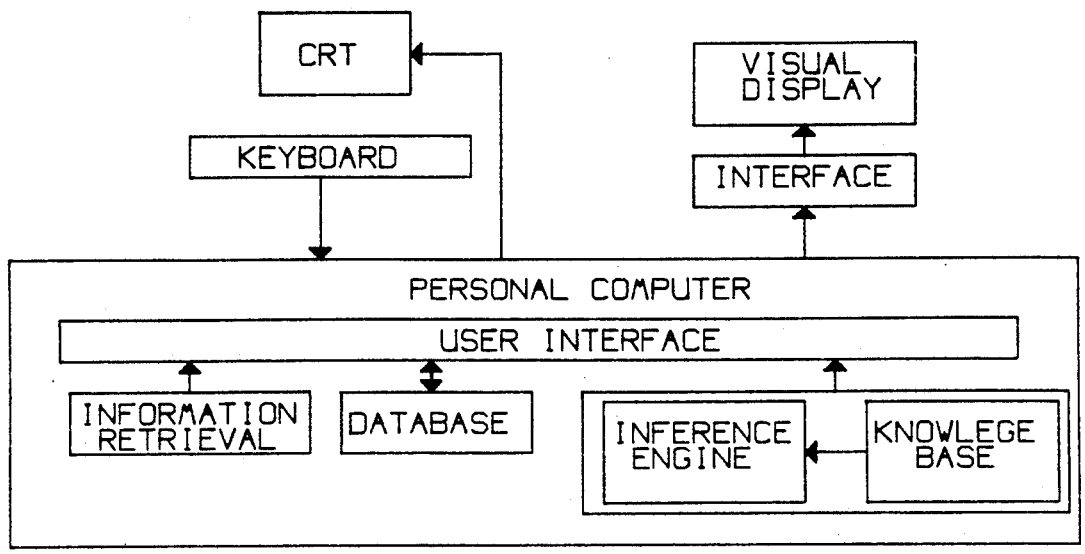
FIG. 1 is a block diagram of a system for a microcomputer based metal failure analysis expert system with visual display according to the invention.

Reference is now made to the figures wherein like numbers refer to like parts throughout. FIG. 1 discloses in block diagram a suitable micro computer structure for implementation of the present invention. A hardware system, generally designated 10 is provided which comprises a personal computer 12, an output device such as a cathode ray tube 14, an input device such as keyboard 16 and a visual display apparatus 18. The visual display apparatus 18 is connected to the personal computer by an interface 20. The visual display 18 is preferably a software controllable visual system. In the preferred embodiment, a software selectable slide system, such as a DUKANE PRO 120 system available from Dukane Corporation can be used. Of course, those skilled in the art will recognize that other visual devices could be used without departing from the spirit and teachings of the present invention. For example, a software controllable video disk might be used, particularly one that can receive new visual images from time to time.

The micro computer 12 comprises a user interface 22 which substantially interconnects the components of the hardware system 10. Associated with the personal computer 12 are various processing commands comprising the control functions of the system. These command structures are preferably implemented in software, but they may also be implemented by EPROMS (erasable programmable read only memory), or by other invariable data processing devices. The control systems comprise an expert system 24, a data base system 26 and an information retrieval system 28, all of which are completely described below. The micro computer 12 further comprises a memory device 25 for storing data.

Figure 2:
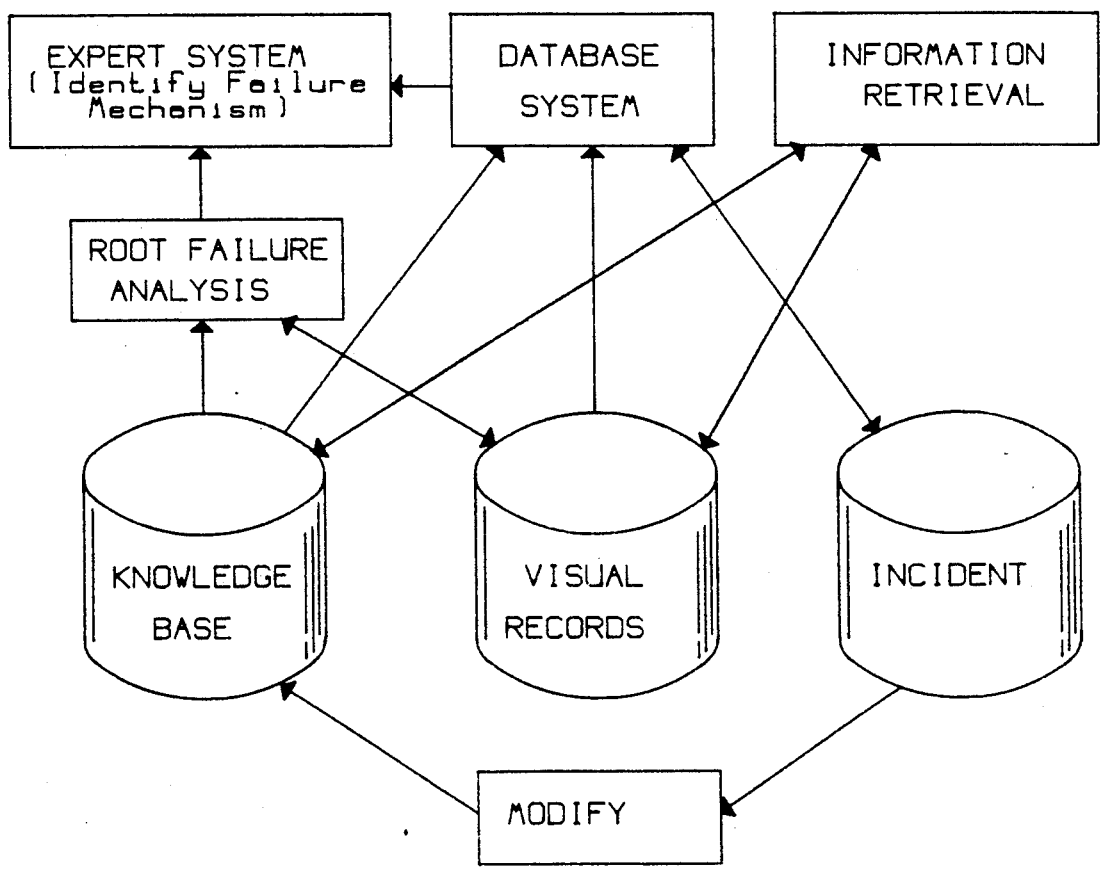
FIG. 2 is a hierarchical diagram of systems and record files.

The interrelationship between the various control systems can best be understood with reference to FIG. 2. The expert system 24 may be invoked to identify a failure mechanism from metal fatigue or otherwise in a system. Expert systems are known in the art. For example, a basic expert system tool is described in U.S. Pat. No. 4,648,044 to Hardy, et al. Using the expert system, a user will interact with the system by responding to queries presented by the expert system with information or selections. To aid the user in making selections, the knowledge base 27 is accessed by the expert system 24 as the inquiry proceeds. From time to time visual records 29 will also be accessed by the expert system to supplement requests for information or to allow the user to select from different visual possibilities to identify the type of a problem or failure. As the user and expert system interact, a record is created of the incident and the expert system 24 gathers data in the incident file 30. This data relates to the specific incident under investigation. The incident file 30 represents not only a record of the particular incident under investigation, but can also be used to accumulate historical and statistical data related to a particular industrial installation or plant. Through inquiry and response, the expert system will identify a likely candidate for a mode of failure related to a particular industrial incident, or it will recognize that insufficient data has been supplied and return a report indicating that no analysis can be made. If an analysis is made, the expert system should again direct the attention of the user to possible causes of the identified failure and to additional tests which may be performed to isolate the failure mode in a root failure analysis 32.

The second control system provided is the data base system 26. This system is used primarily to access records of incidents previously stored through the expert system. However, the data base system can also be used to build its own records of incidents, even if a failure analysis is not performed. The data base system 26 provides the user with access to individual incident and to statistical compilations of numerous incidents. The user is assisted in understanding the incident by access to the visual records 29 which provide generalized visual displays of types of failure modes or parts. It will be noted that by using a high quality visual display, such as the photographic slide projecting visual display 18 mentioned above, a very clear understanding of the part or type of failure can be expected. The data base system 26 can also access the expert system 24 and the knowledge base 27 from time to time to perform subanalysis of particular incidents file.

The third control system is the information retrieval system 28. Using the information retrieval system 28, a user can access the knowledge base 27 and associated visual records 29 in the manner of a reference library. No information on a particular incident is required. Examples of parts, types of failure, or other information can be retrieved quickly and easily.

As pointed out above, both the expert system 24 and the data base system 26 can accumulate incident information in the incident file 30. From time to time the information in the incident file 30 is complied statistically to modify 32 the knowledge base 27. This enables the knowledge base 27 to be continually updated by ongoing accumulation of information.

Figure 3A:
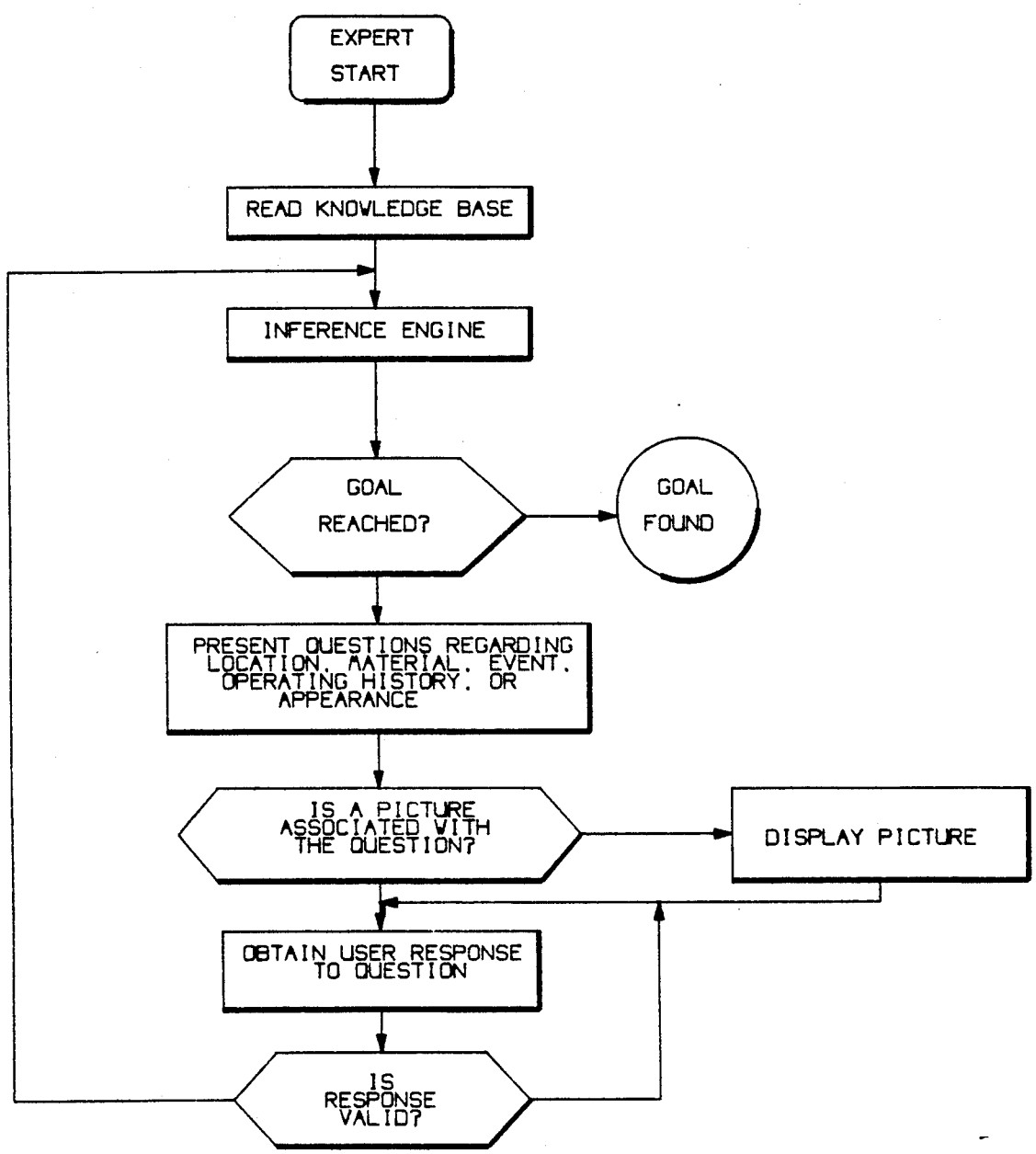
FIGS. 3A and 3B are a flow chart for the expert system subsystem, including access to the visual display.
Figure 3B:
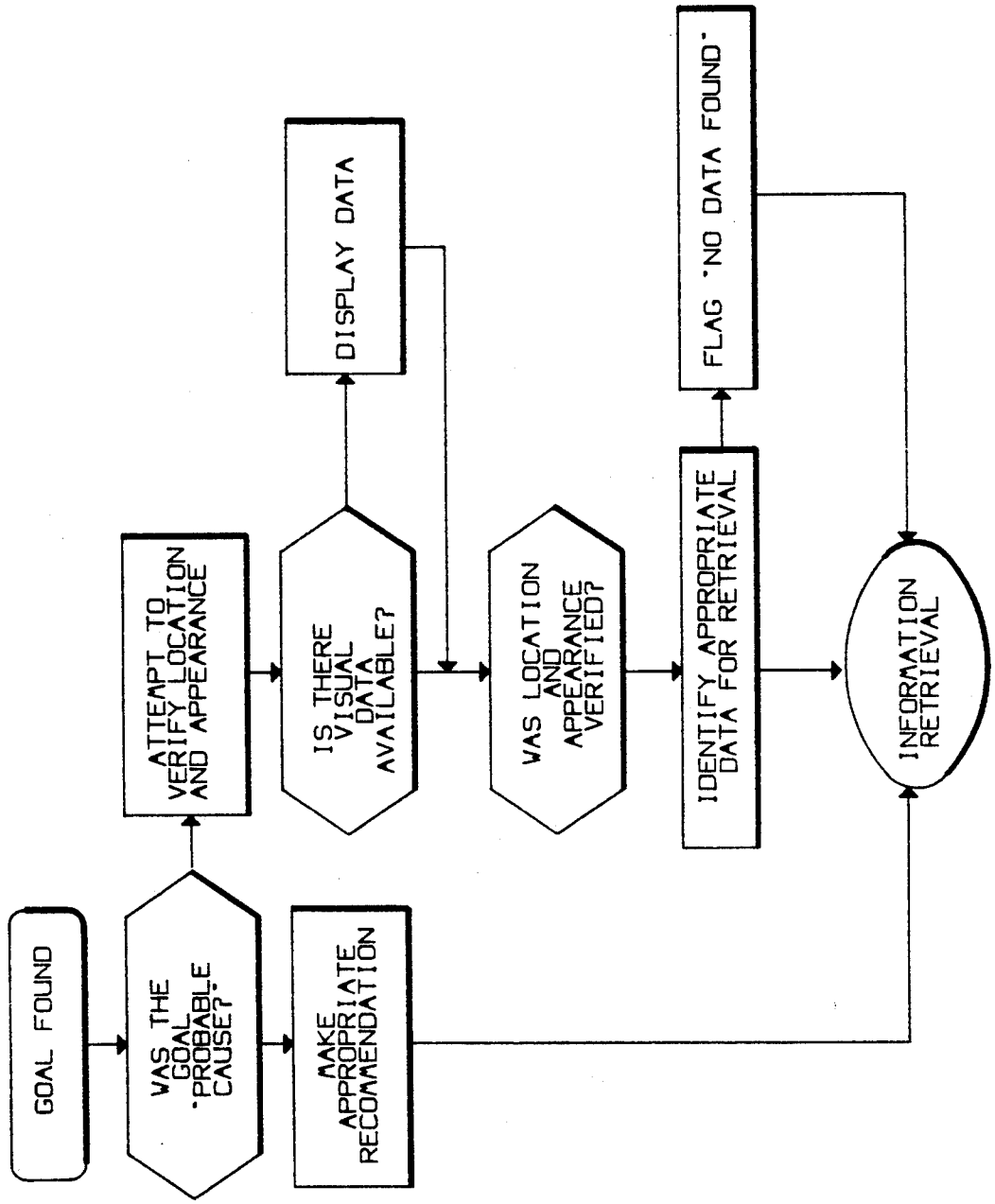

Reference is now made to FIG. 3, wherein a flow chart for an expert system, including access to visual records is disclosed. The expert system 24 is invoked at a start command 34. In a conventional manner, the knowledge base 27 is accessed 36 to commence a user-computer interaction. As information is gathered from the user, an inference engine 38 selects among possible inquiry pathways. A typical inference engine is described in Hardy, U.S. Pat. No. 4,648,044, mentioned above. If the inference engine 38 concludes that the goal of the inquiry was reached 40, that is, that a possible failure mode has been identified, control of the program will be directed to the root failure analysis 32 more particularly described below. If the goal has not been reached 40, a further question will be presented 42 regarding location, material, event, operating history, appearance or other relevant factor. When a question has been isolated, it will be determined 44 if a picture or visual display is associated with the particular question. This may comprise either a single visual display or a series of visual displays which may be associated with a multiple part question. If a picture is found, a command is issued to the visual display 18 to display 46 the picture. A user response 48 to the question is then required. The system 24 will then check 50 for a valid response and either return control for re-entry of the response if the response was invalid, or, if the response was valid, branch to the inference engine 38. The loop is continued until it is determined that the inquiry has been successful and the goal has been reached 40.

When the goal has been reached 40, program control branches, in the preferred embodiment, to a root failure analysis 32. Inquiry 50 is made if the selected possible failure mode has a probable cause of failure. If it can not be determined that the root cause of failure has been reliably identified, an attempt to verify 54 the location and appearance of the failure will be made. The root failure analysis system 32 will check 56 to determine if there is visual data available associated with a particular possible failure mode. If visual data is available, it will be displayed 58 on the video display 18. A response is then requested 60 from the user to determine if the location and appearance is verified. If the user agrees that the visual appearance of the possible failure cause is sufficiently similar to the actual appearance of failed parts, data related to the failure cause is retrieved 62. This data may relate to suggested additional tests which may be performed to further isolate the root causes of a failure or may identify, for example, possible steps which may be taken to alleviate the causes of failure. If no additional data is found, a report 64 is made. If it is determined 52 that the identified possible root failure is indeed the most probable, appropriate recommendations for further testing for preventative or other measures will be made 66. When the root failure analysis 32 is substantially complete, the information gathered during the expert system operation 24 and the root failure analysis 32 will be stored 68 for information retrieval in the incident file 30. A program listing has been provided in a Microfiche Appendix, which is incorporated herein by reference.

Figure 4:
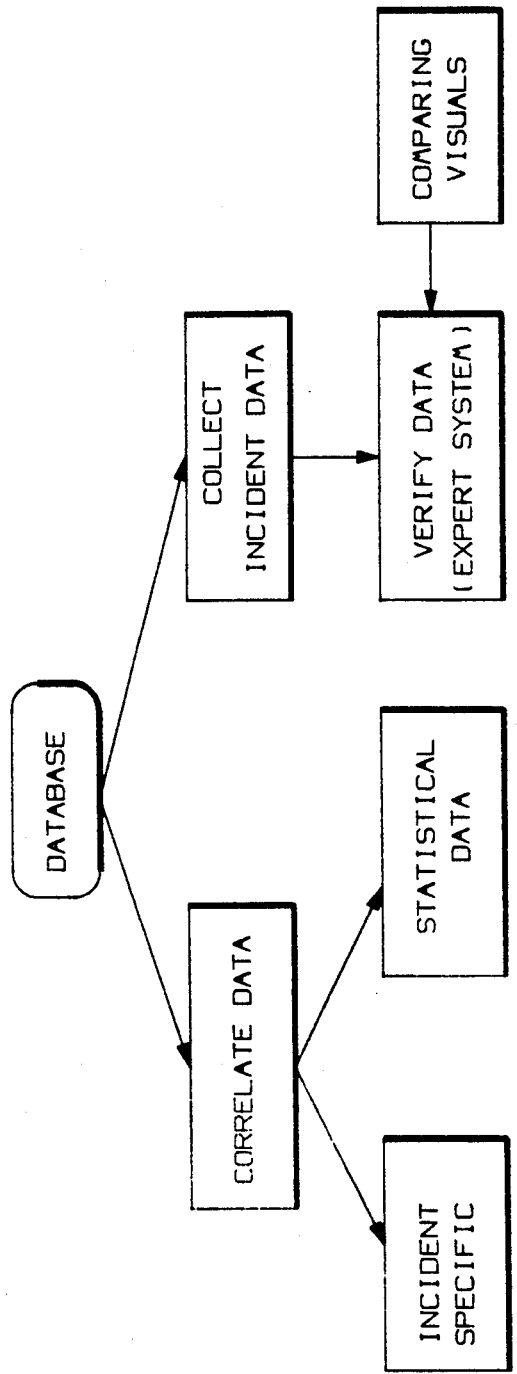
FIG. 4 is a hierarchical diagram of the data base subsystem.

Reference is now made to FIG. 4 wherein a functional diagram of the data base system 26 is disclosed. When the data base system is invoked 68 the user may choose to either correlate data 70 or to collect incident data 71. If data is to be correlated 70 the user may further choose to recall incident specific data 72 related to a particular incident which has previously been recorded. Statistical data 74 may be complied concerning a range of incidents already available and collected in the system. Different parameters may be selected for statistical analysis. Such factors may include specific plants, time periods, types of parts, types of failure or other types of information available to the system. If the user chooses to collect incident data 71, an abbreviated form is provided to accumulate data which might otherwise be collected through the expert system 24. At intervals during the data collection process, the user may choose to branch to the expert system to verify data 76. Through this means, the user will have access to the visual records 28 through the visual display 18 to compare 78 the visuals. This will permit the user to increase confidence level in the accuracy of information by comparing the expected information with the visual examples. A program listing has been provided in a Microfiche Appendix, which is incorporated herein by reference.

Figure 5:
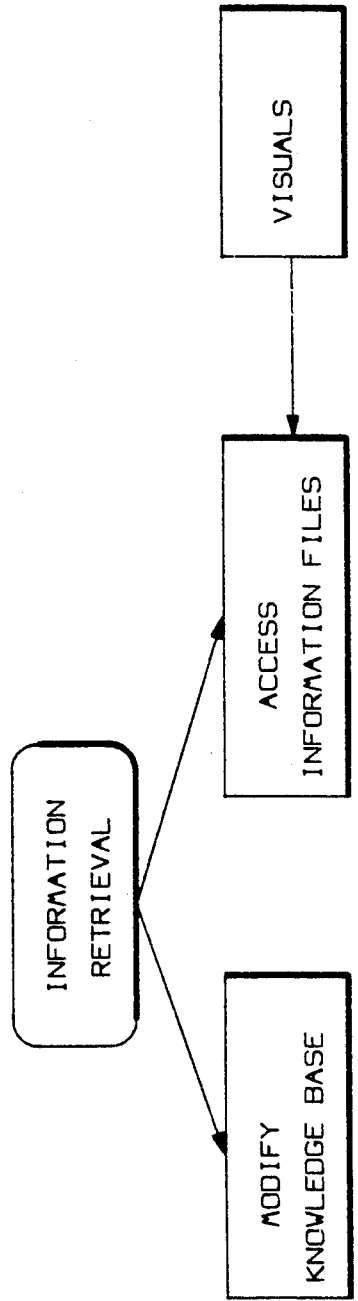
FIG. 5 is a hierarchical diagram of the information retrieval subsystem.

The third system is the information retrieval system 28. A functional block diagram of this system is disclosed in FIG. 5. When the information retrieval system is invoked 80, the user may choose to directly modify 82 the knowledge base or to merely access 84 the knowledge base as a computerized index. As information is retrieved, the associated visuals 86 will be recalled from the visual records 28 and displayed through the visual display 18. A program listing has been provided in a Microfiche Appendix, which is incorporated herein by reference.

Each of these systems, therefore, provide interactive access to the visual information contained in the visual records 28. It can be expected, therefore, that the systems can be used with substantial accuracy by persons with minimal expertise. Rapid access to visual information correlated with specific information seeking-questions will increase the reliability of the information gathered and of the resulting analysis. The invention may be embodied in other specific forms without departing from the spirit or teachings of the present invention. All embodiments, therefore, which come within the meaning and range of the doctrine equivalents are intended to be included herein and the scope of the invention should be determined by the appended claims, and not by the foregoing description.

What is desired to be claimed and secured by United States Letters Patent is:

1. A digital processing system with expert system part failure analysis, said system comprising
    a digital data processing device;
    data storage means in electrical communication with said digital data processing device;
    knowledge base means carried on said data storage means for identifying a possible mode of failure;
    input means in electrical communication with said digital data processing device;
    output means in electrical communication with said digital data processing device;
    visual display means for displaying macroscopic or microscopic views of selected part failures, said visual display means being in electrical communication with said digital data processing device;
    expert system means controlling the digital data processing device for requesting and receiving, through the output device, information from a user while displaying at least one of said selected views on the visual display means, said view being associated with at least some of the requests for information;
    program means for receiving responses from the user through the input device;
    inference engine means for logically correlating said received information with said knowledge base to isolate possible failure modes; and
    incident file means carried on said storage means for retaining a record of the information requested and received from the user.

2. A system according to claim 1 further comprising data base means controlling said digital data processing device for enabling a user to request data from or transfer data to the incident file means or the knowledge base means while displaying at least one of said macroscopic or microscopic views associated with the user's request for data on the visual display means.

3. A system according to claim 2 further comprising information retrieval means for accessing data in the knowledge base means while displaying, on said visual display means, at least one of said macroscopic or microscopic views associated the knowledge base data.

4. A system according to claim 3 further comprising modifying means for periodically correlating data carried in said incident file means and modifying said knowledge base means in accordance with the correlated data.

5. A system according to claim 1 further comprising root failure analysis means controlling the digital data processing device for confirming the possible failure modes identified by the inference engines means by requesting additional information from the user while displaying, on the visual display means, at least one of said macroscopic or microscopic views associated with the request for additional information.

6. A system according to claim 5 further comprising data base means for controlling said digital processing device for enabling a user to request data from or transfer data to the incident file means or the knowledge base means while displaying, on the visual display means, at least one of said macroscopic or microscopic views associated with the user's request for data.

7. A system according to claim 6 further comprising information retrieval means for accessing data in the knowledge base means while displaying, on the visual display means, at least one of said macroscopic or microscopic views associated with the knowledge base data.

8. A system according to claim 7 further comprising modifying means for periodically correlating data carried in said incident file means and modifying said knowledge base means in accordance with the correlated data.

9. A method for expert system part failure analysis, said method comprising the steps of
    requesting failure related information from a user through a digital data processing device;
    displaying at least one macroscopic or microscopic view of a part failure associated with a request for information;
    accessing a knowledge base containing part failure information;
    correlating said user information and said knowledge base information;
    identifying possible failure modes and storing said requested information.

10. A method according to claim 9 further comprising the steps of requesting confirming information from the user; and verifying the identified possible failure mode by displaying at least one macroscopic or microscopic view of a part failure associated with the request for confirming information.

11. A method according to claim 10 further comprising the steps of accessing failure information contained in the knowledge base; and
    associating a a macroscopic or microscopic view of a part failure with the part failure information and displaying said view.

12. A method according to claim 11 further comprising the steps of
    inputting failure incident related information into the digital data processing device;
    selectively accessing failure information contained in the knowledge base during the inputting step, associating a macroscopic or microscopic view of a part failure with part material failure information, displaying said view, and storing said failure incident related information.

13. A method according to claim 12 further comprising the steps of correlating requested failure-related information, correlating input failure incident related information and modifying the knowledge base according to the correlated requested failure-related information and the correlated input failure incident related information.

* * * * *